United States Patent
McGlaughlin

(10) Patent No.: US 7,660,302 B2
(45) Date of Patent: Feb. 9, 2010

(54) METHOD AND SYSTEM FOR INTER-FABRIC ROUTING

(75) Inventor: Edward C McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 414 days.

(21) Appl. No.: 11/453,500

(22) Filed: Jun. 15, 2006

(65) Prior Publication Data
US 2007/0291758 A1 Dec. 20, 2007

(51) Int. Cl.
*H04L 12/28* (2006.01)
*H04L 12/56* (2006.01)

(52) U.S. Cl. ........................ 370/389; 370/392

(58) Field of Classification Search ................ 370/351, 370/412, 360, 394; 710/2, 8, 31; 711/131
See application file for complete search history.

(56) References Cited

U.S. PATENT DOCUMENTS

| | | | | |
|---|---|---|---|---|
| 5,694,615 A | * | 12/1997 | Thapar et al. | 710/2 |
| 5,894,481 A | * | 4/1999 | Book | 370/412 |
| 6,185,203 B1 | * | 2/2001 | Berman | 370/351 |
| 7,200,144 B2 | * | 4/2007 | Terrell et al. | 370/389 |
| 2003/0189936 A1 | * | 10/2003 | Terrell et al. | 370/395.31 |
| 2005/0268043 A1 | * | 12/2005 | Kitamura | 711/131 |

* cited by examiner

*Primary Examiner*—Chirag G Shah
*Assistant Examiner*—Minh-Trang Nguyen
(74) *Attorney, Agent, or Firm*—Klein, O'Neill & Singh, LLP

(57) ABSTRACT

A Fibre Channel Switch element and method for Inter-Fabric routing is provided. The switch element includes a switch port whose worldwide port number is used in a zone set to enable Inter-Fabric frame routing without using Inter-Fabric frame headers. The method includes querying a Name Server to determine world wide port numbers of devices; storing query results in an Inter-Fabric Name Server module; extracting world wide port numbers for each switch port; registering Proxy Devices with the Name Server, wherein the Proxy Devices interface with the switch ports as if it was they were actual devices to route Inter-Fabric frames; and establishing Fabric Address Translator entries so that source identification values and destination identification values are mapped to route Inter-Fabric frames without using Inter-Fabric frame headers.

17 Claims, 9 Drawing Sheets

METHOD AND SYSTEM FOR INTER-FABRIC ROUTING

BACKGROUND

1. Field of the Invention

The present invention relates to Fibre Channel network systems, and more particularly, to Inter-Fabric routing.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel Fabric. The point-to-point topology attaches two devices directly. The arbitrated loop topology attaches devices in a loop. The Fibre Channel Fabric topology attaches host systems directly to a Fabric, which are then connected to multiple devices. The Fibre Channel Fabric topology allows several media types to be interconnected.

Fibre Channel Fabric devices include a node port or "N_Port" that manages Fabric connections. The N_port establishes a connection to a Fabric element (e.g., a switch) having a Fabric port or "F_port".

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Most Fibre Channel SANs are currently used as "SAN Islands". The term island as used herein means an isolated fully contained SAN. The use of SAN islands has been common because switch suppliers have forced limits on SAN size and Information Technology managers have been reluctant to build larger SANs due to concerns about fault containment.

Inter-Fabric routing is an emerging concept in which SAN islands operate independently but can access devices among themselves using Inter-SAN (or Inter Fabric) routers. New header types are being proposed to facilitate Inter-Fabric routing. One disadvantage of this approach is that switch devices have to accommodate new header types, new Fabric routing protocols and extensions.

Therefore, there is a need for a method and system that can accommodate Inter-Fabric routing under current Fibre Channel protocol without having to rely on new headers, extensions and protocol changes.

SUMMARY OF THE INVENTION

In one aspect of the present invention, a Fibre Channel Switch element is provided. The switch element includes a switch port whose world wide port number is used in a zone set to enable Inter-Fabric frame routing without using Inter-Fabric frame headers.

In another aspect of the present invention, a Fibre Channel network is provided. The network includes at least two Fabrics coupled to a host system and a target device; and a Fibre Channel switch element comprising at least a switch port whose world wide port number is used in a zone set to enable Inter-Fabric frame routing without using Inter-Fabric frame headers.

In yet another aspect of the present invention, a method for routing Inter-Fabric frames using a Fibre Channel switch element with plural ports is provided. The method includes querying a Name Server to determine world wide port numbers of devices; storing query results in an Inter-Fabric Name Server module; extracting world wide port numbers for each switch port; registering Proxy Devices with the Name Server, wherein the Proxy Devices interface with the switch ports as if they were actual devices, to route Inter-Fabric frames; and establishing Fabric Address Translator entries so that source identification values and destination identification values are mapped to route Inter-Fabric frames without using Inter-Fabric frame headers.

In yet another aspect of the present invention, a method for routing Inter-Fabric frames is provided. The method includes receiving a frame from a Native Device with a proxy D_ID for a Proxy device; delivering the frame to a port that manages the Proxy Device; replacing the proxy D_ID with a D_ID of an actual target device; and replacing native S_ID with a proxy S_ID; and delivering the frame to a destination Fabric.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

Figure 1A:
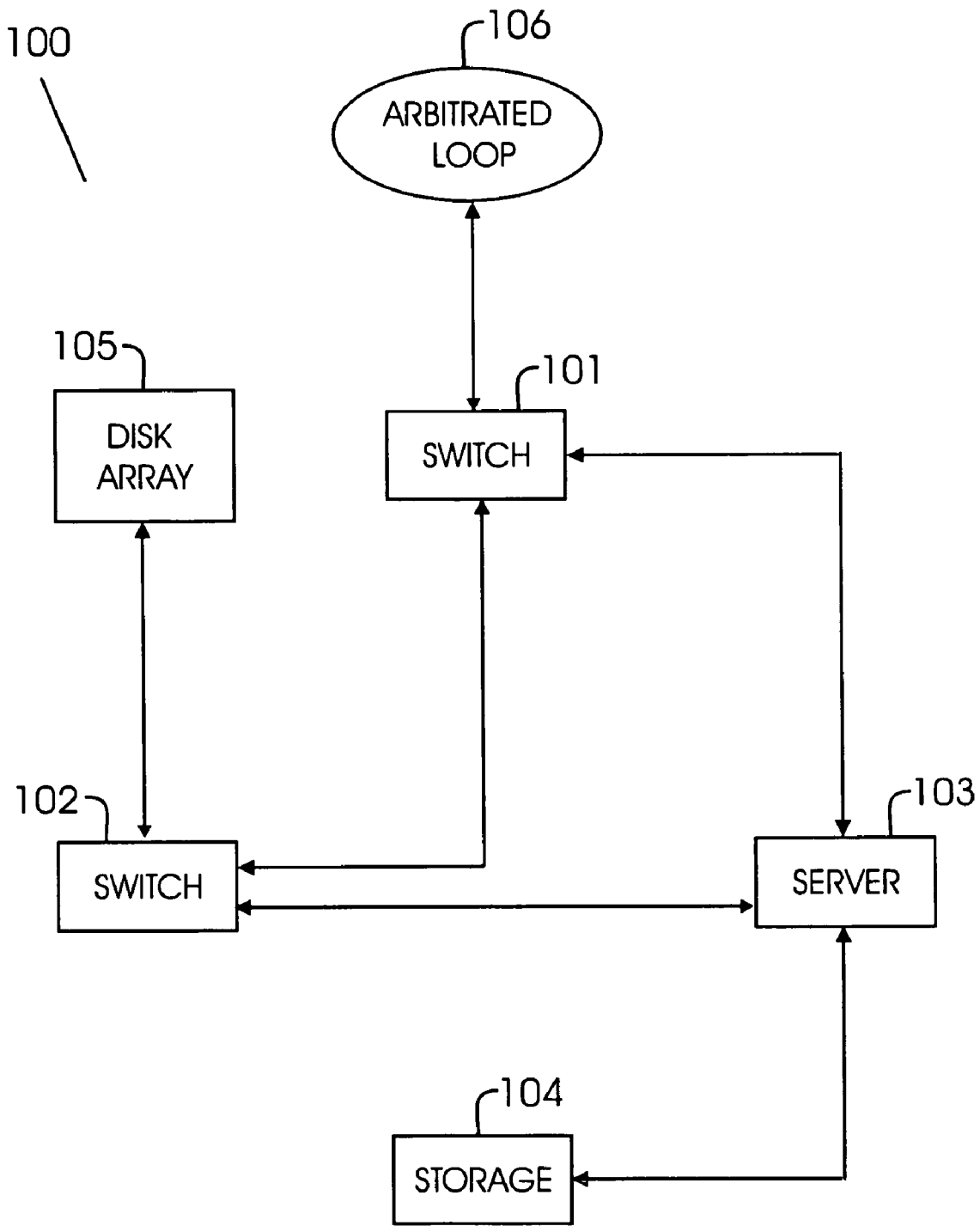
FIG. 1A shows an example of a network system used according to one aspect of the present invention.

The following definitions are provided for convenience as they are typically (but not exclusively) used in the Fibre Channel environment, implementing the various adaptive aspects of the present invention.

"CRC" (cyclic redundancy code): A 4 byte value used for checking data integrity of a Fibre Channel frame.

"D_ID": A 24-bit Fibre Channel header field that contains the destination address for a frame.

"E_Port": An expansion port that is used to connect Fibre Channel Switch elements in a Fabric.

"Fabric": The structure or organization of a group of switches, target and host devices (NL_Port, N_ports etc.).

"Fabric Tag": An identifier assigned to each Fabric and it's value is set to the port number of the SF_Port that has a native connection to the Fabric.

"FAT": Fabric Address Translator that monitors incoming frames, compares D_ID and S_ID values, and when a match is found, replaces the D_ID and S_ID values with those contained within FAT and then recalculates the CRC for integrity check.

"F_Port": A port to which non-loop N_Ports are attached to a Fabric and does not include FL_ports.

"Fibre Channel ANSI Standard" ("FC-FS-2"): The standard (incorporated herein by reference in its entirety) describes the physical interface, transmission and signaling protocol of a high performance serial link for support of other high level protocols associated with IPI, SCSI, IP, ATM and others.

"Inter Fabric Header": The Inter Fabric Routing Extended Header (IFR_Header) is used for routing Fibre Channel frames from one Fabric to another. It provides the Fabric identifier of the destination Fabric, the Fabric identifier of the source Fabric and information to determine hop count.

"Inter-Fabric Name Server" (INS): This provides an Inter-Fabric super set Name Server database for all attached Fabrics and includes connectivity state information for Inter-Fabric bridged devices.

"Native Device": This is a logical or physical device that is a part of a SAN and can be shared among multiple Fabrics.

Native Fabric: This is the Fabric where the Native Device resides.

"N_Port": A direct Fabric attached port, for example, a disk drive or a HBA.

"NL_Port": A L_Port that can perform the function of a N_Port.

"Proxy Device": This is a logical device that represents a Native Device. The Proxy Device resides in a Proxy Fabric.

"Proxy Fabric": A Fabric that can access/utilize a Native Device without having the Native Device actually reside in the Fabric.

"S_ID": A 24-bit, Fibre Channel Source identifier that identifies the source of a frame.

"Switch": A Fabric element conforming to the Fibre Channel Switch standards.

SF_Port: A Synthetic Fabric Port that emulates N_port behavior with respect to an external switch and performs Inter-Fabric bridging port functionality within a Synthetic Fabric Switch.

Synthetic Fabric Switch: A switch, according to one aspect of the present invention that facilitates Inter-Fabric routing.

In one aspect of the present invention, a Fabric Switch is provided that can handle Inter-Fabric routing. The switch operates as a bridge between different Fabrics and uses an Inter-Fabric zone set with an Inter-Fabric Name Server.

To facilitate an understanding of the preferred embodiment, the general architecture and operation of a Fibre channel System and a Fibre Channel switch element will be described. The specific architecture and operation of the preferred embodiment will then be described with reference to the general architecture.

Fibre Channel System:

FIG. 1A is a block diagram of a Fibre Channel system 100 implementing the methods and systems in accordance with the adaptive aspects of the present invention. System 100 includes plural devices that are interconnected. Each device includes one or more ports, classified as node ports (N_Ports), Fabric ports (F_Ports), and expansion ports (E_Ports). Node ports may be located in a node device, e.g. server 103, disk array 105 and storage device 104. Fabric ports are located in Fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N_PORT in server 103 may establish a path with disk array 105 through switch 102.

Figure 1B:
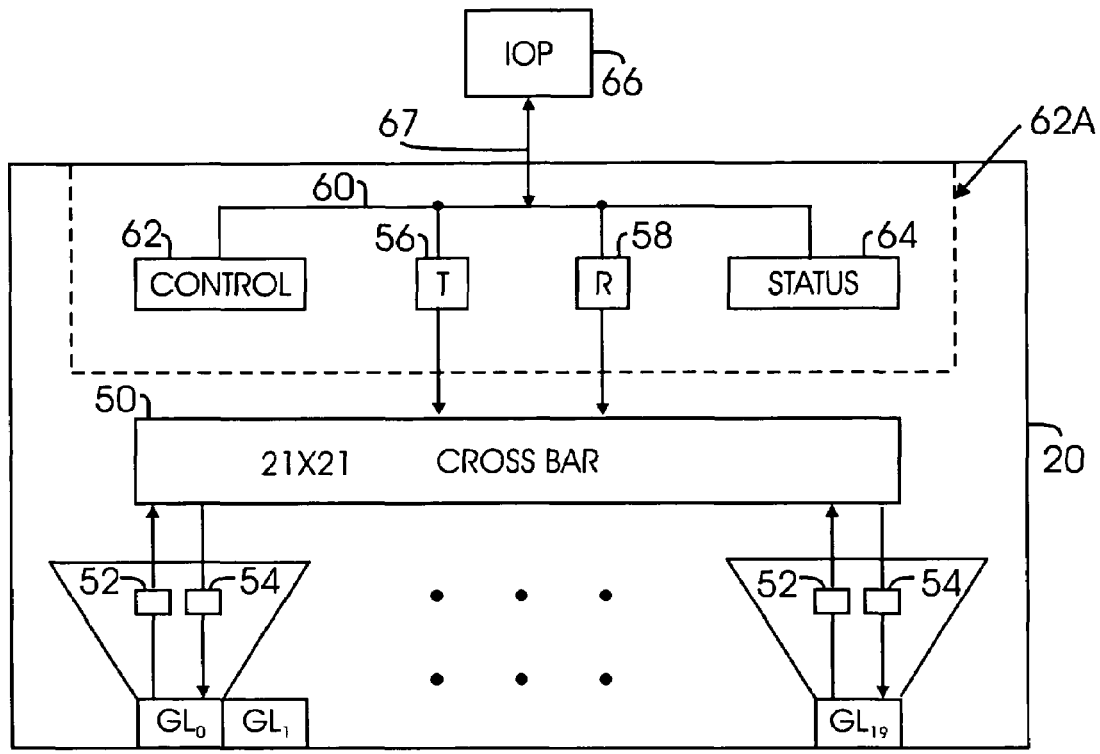
FIG. 1B shows an example of a Fibre Channel switch element, according to one aspect of the present invention.

Fibre Channel Switch Element:

FIG. 1B is a block diagram of a 20-port ASIC Fabric element according to one aspect of the present invention. FIG. 1B provides the general architecture of a 20-channel switch chassis using the 20-port Fabric element. Fabric element includes ASIC 20 with non-blocking Fibre Channel class 2 (connectionless, acknowledged) service and class 3 (connectionless, unacknowledged) service between any ports. It is noteworthy that ASIC 20 may also be designed for class 1 (connection-oriented) service, within the scope and operation of the present invention as described herein.

The Fabric element of the present invention is presently implemented as a single CMOS ASIC, and for this reason the term "Fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E_PORT. In other words, depending upon what it is attached to, each GL port can function as any type of port. Also, the GL port may function as a special port useful in Fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 is comprised of transmit and receive connections to switch crossbar 50. Within each port, one connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a Fabric controller, which may be external to ASIC 20.

In the preferred embodiments of switch chassis described herein, the Fabric controller is a firmware-programmed microprocessor, also referred to as the input/output processor ("IOP"). As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

Figure 1C:
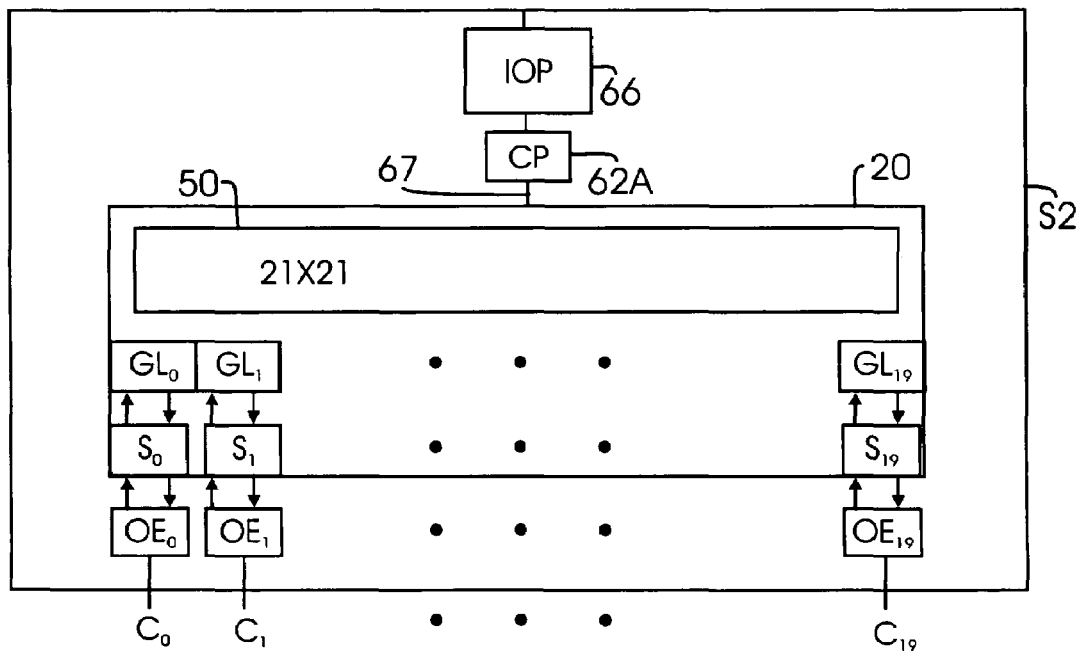
FIG. 1C shows a block diagram of a 20-channel switch chassis, according to one aspect of the present invention.

FIG. 1C shows a 20-channel switch chassis S2 using ASIC 20 and IOP 66. IOP 66 in FIG. 1C is shown as a part of a switch chassis utilizing one or more of ASIC 20. S2 will also include other elements, for example, a power supply (not shown). The 20 GL_Ports correspond to channels C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
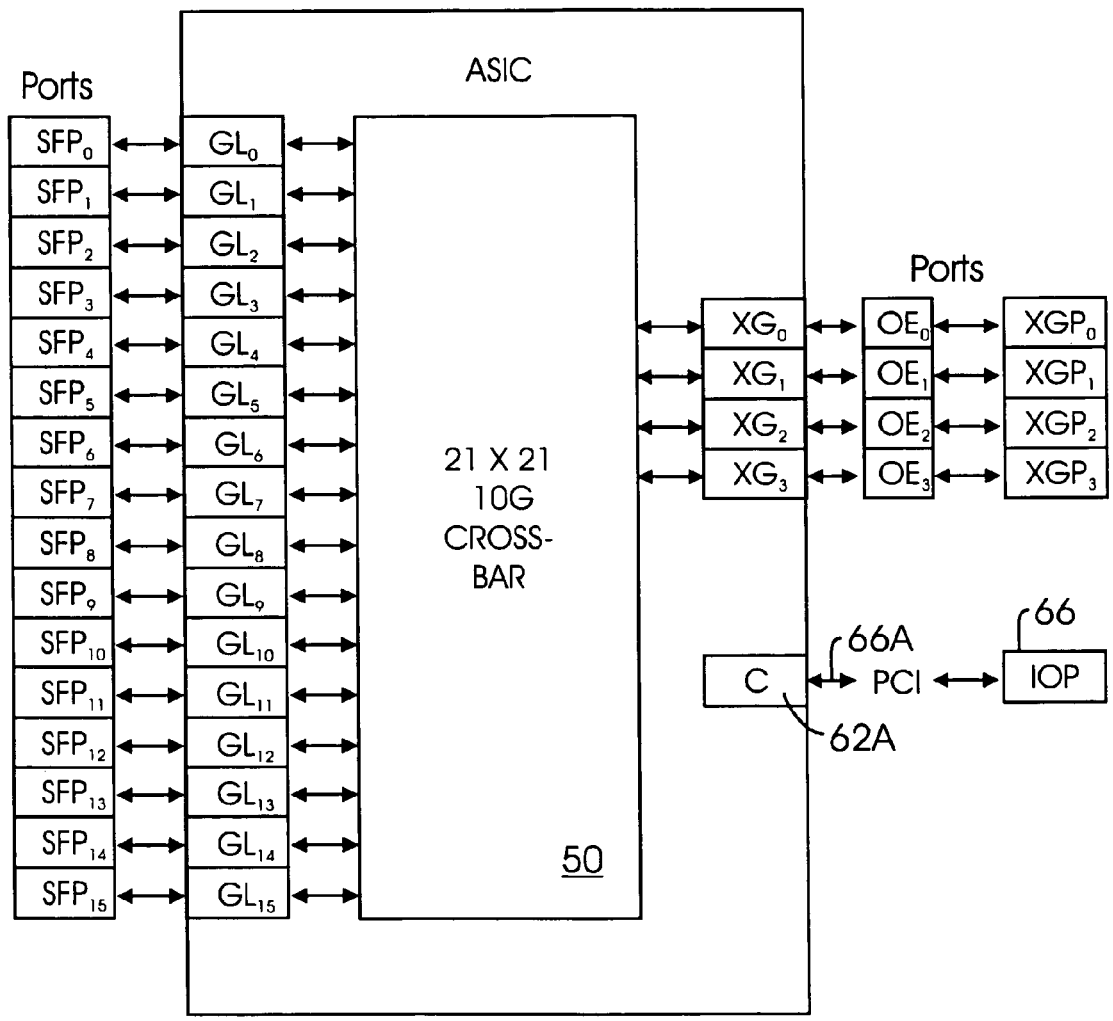
FIG. 1D shows a block diagram of a Fibre Channel switch element with sixteen GL_Ports and four 10G ports, according to one aspect of the present invention.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figures 1, 1E:
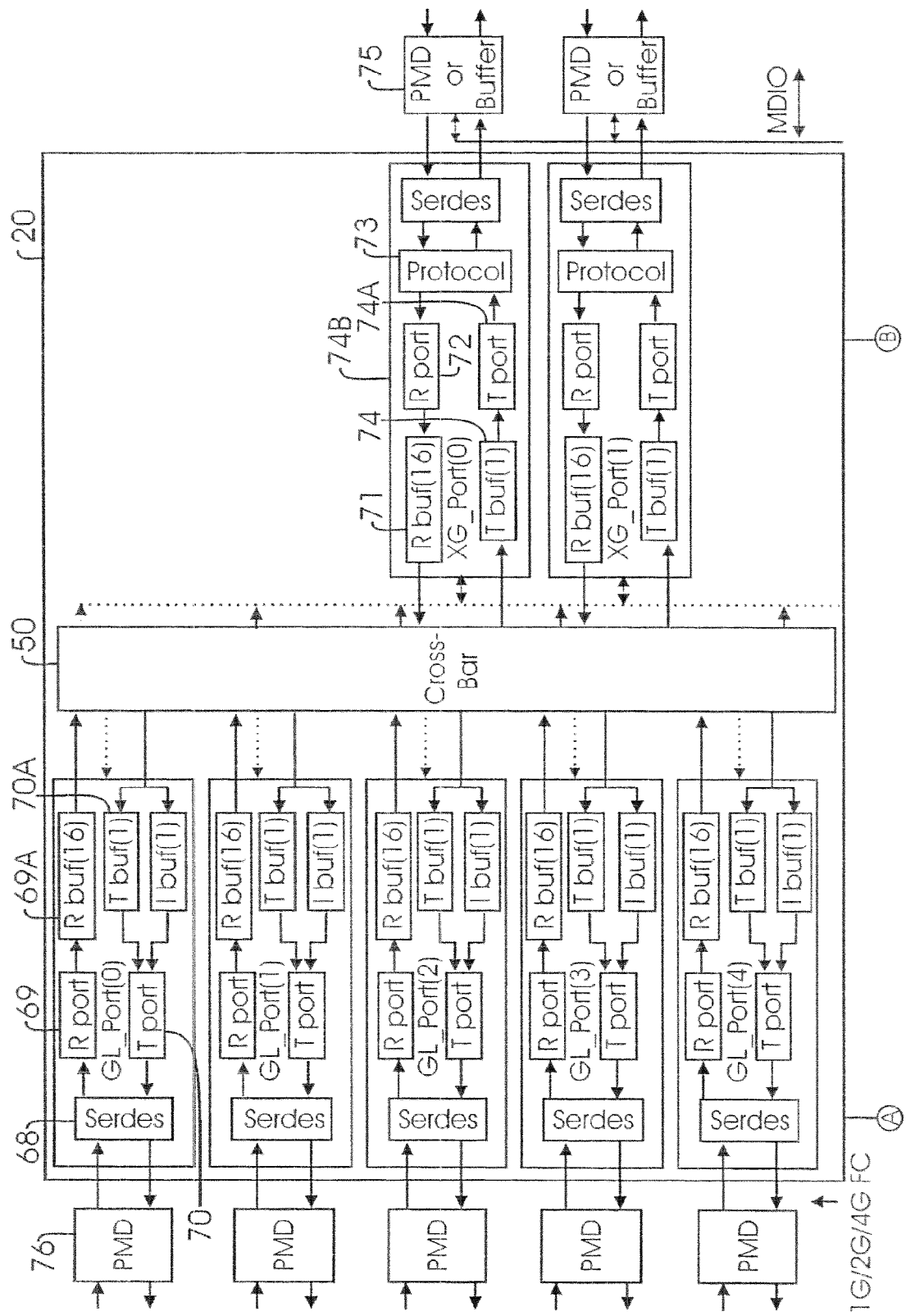
FIGS. 1E-1/1E-2 shows a top-level block diagram of a switch element used according to one aspect of the present invention.

FIGS. 1E-1/1E-2 (jointly referred to as FIG. 1E) show yet another block diagram of ASIC 20 with sixteen GL and four XG port control modules. Each GL port control module has a Receive port (RPORT) 69 (similar to 58, FIG. 1B) with a receive buffer (RBUF) 69A (similar to 58, FIG. 1B) and a transmit port (T PORT) 70 with a transmit buffer (TBUF) 70A (similar to 56, FIG. 1B). GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF 74B and TPORT 74A similar to TBUF 70A and TPORT 70. Protocol module 73 interfaces with SERDES to handle protocol based functionality.

Incoming frames are received by RPORT 69 via SERDES 68 and then transmitted using TPORT 70. Buffers 69A and 70A are used to stage frames in the receive and the transmit path.

Figures 1, 1E, 2:
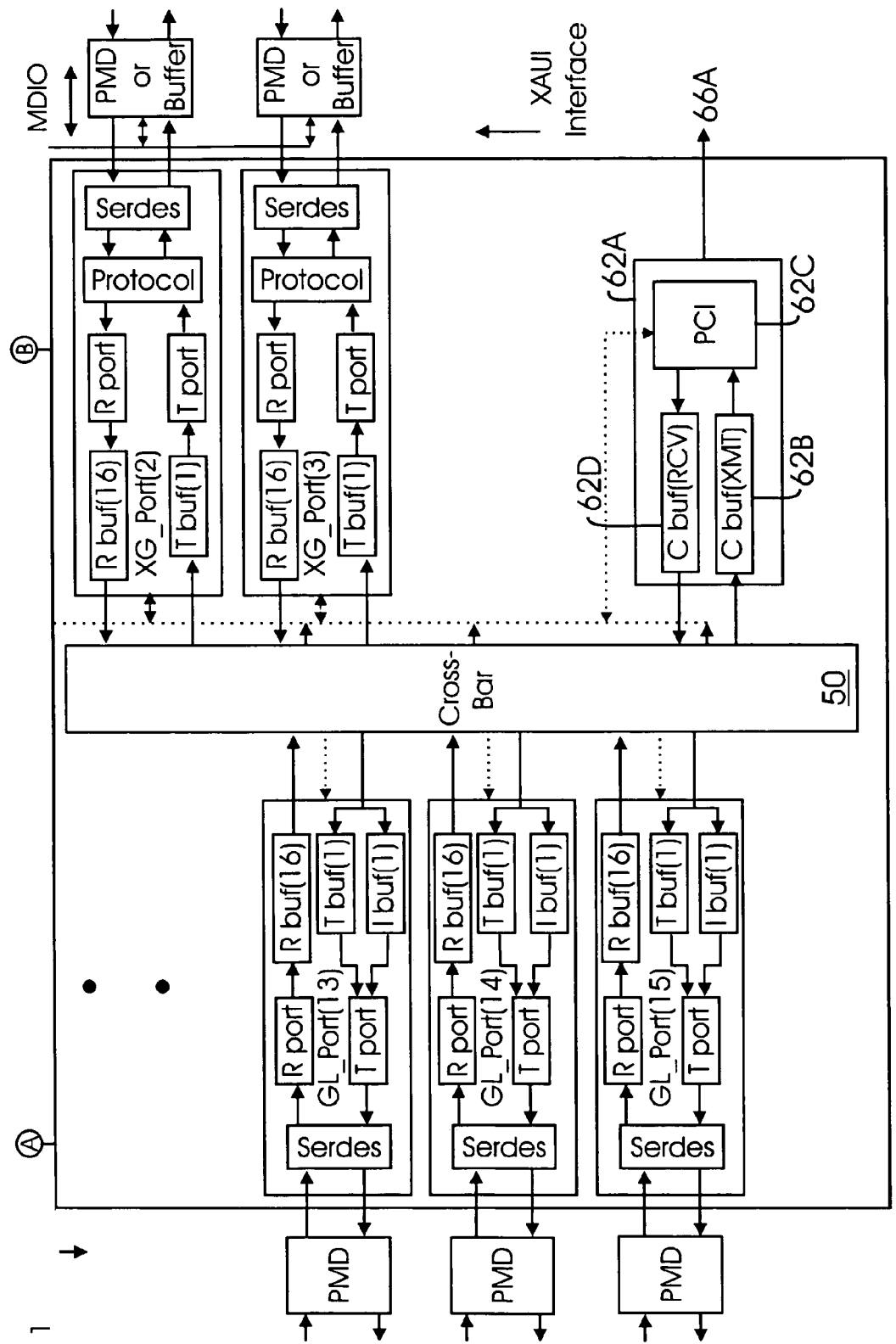
FIG. 2 shows a block of a switch element, according to one aspect of the present invention.
Figure 1F:
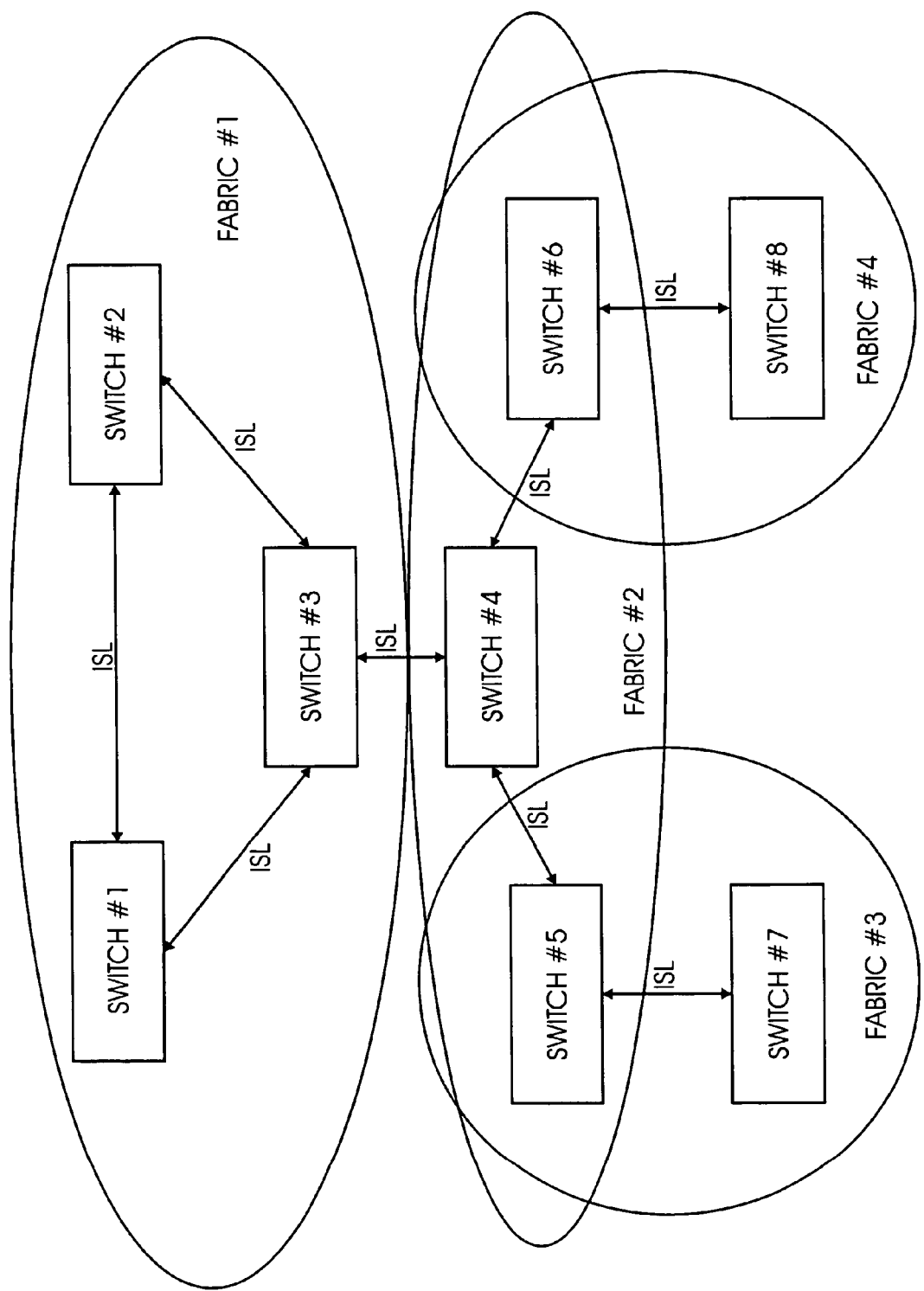
FIG. 1F shows the Inter-Fabric structure used, according to one aspect of the present invention.
Figure 2:
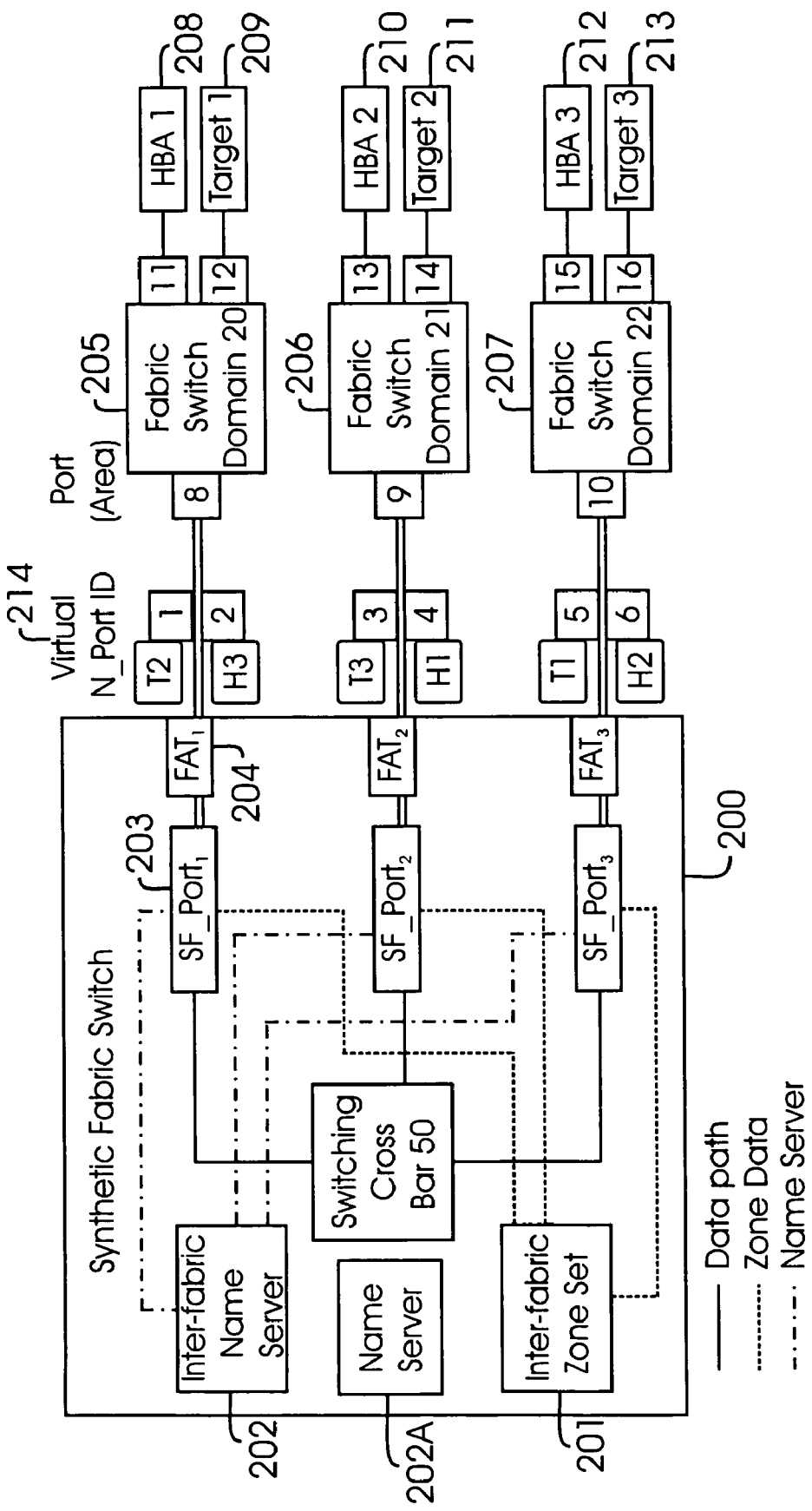

FIG. 1F shows an example of Inter-Fabric connections used, according to one aspect of the present invention. Eight Fabric switch are shown (numbered 1 through 8) to illustrate Inter-Fabric routing. Switch # 1 is coupled to Switch # 2, while Switch # 3 is coupled to Switch # 1 and 2. Fabric 1 includes Switch #1, 2, and 3.

Fabric 2 includes Switch 4, 5 and 6. Fabric 3 includes Switch 5 and Switch 7, while Fabric 4 includes Switch 6 and Switch 8. It is noteworthy that the present invention is not limited to any particular number of Fabrics or switches.

FIG. 2 shows a block diagram of a Synthetic Fabric Switch (may also be referred to as Switch) 200 with a plurality of SF_Ports 203 (shown as SF_Port1, SF_PORT2 . . . SF_Port3). Switch 200 supports Inter-Fabric routing without using Inter-Fabric headers. It achieves this by proving Proxy Devices and address translation. Bridging between Fabrics is enabled when there is a pair of Inter-Fabric SF_Port World Wide Port Number (SF_port WWPN) entries in at least one Inter-Fabric Zone Set with a common zone name. The zoning information is maintained in a database shown as Inter-Fabric Zone Set (database) 201. It is noteworthy that database 201 can be stored on switch 200 memory or accessible to switch 200. The zone sets and the way they are used are described below in more detail.

Each SF_Port 203 has access to a Fabric Address Translation module ("FAT") 204 (shown as FAT1, FAT2 and FAT3 for each SF_Port1, SF_Port2 and SF_Port3, respectively). FAT 204 performs address translation that is used to move frames between different ports.

Each SF_Port is attached to a Fabric Switch, shown as Fabric Switch Domain 205, 206 and 207. Each Fabric Switch can be coupled to various targets and host systems (via host bus adapters (HBAs)). For example, Fabric Switch 205 is coupled to HBA 208 (shown as HBA 1) and to Target (which includes storage devices and/or storage sub-systems) 209 (shown as Target 1). Fabric Switch 206 is coupled to HBA 210 and Target 211 (shown as Target 2), while Fabric Switch 207 is coupled to HBA 212 and Target 213 (shown as Target 3).

Each SF_Port gets a unique identifier ("ID") when it logs in. For example, SF_PORT 1 has the following identifier: 20.8.0, where 20 denotes the Domain ID for Fabric Switch 205, 8 denotes the Area ID for Fabric Switch 205 and 0 is the Port ID for SF_Port1. Similarly, SF_Port 2 has a unique ID value shown as 21.9.0, where 21 is the Domain ID, 9 is the Area ID and 0 is the Port ID; while SF_Port 3 has an identifier shown as 22.10.0, where 22 is the Domain ID, 10 is the Area ID and 0 is the Port ID.

Fibre Channel Standard FC-SW-2, incorporated herein by reference in its entirety, defines Fibre Channel switch addressing. Typically, a 24-bit identifier is used to uniquely identify a switch. The 24 bit address includes a 8-bit Domain Identification ("Domain_ID.") number; 8-bit Area Identifier (Area_ID) and 8-bit Port Identifier (Port_ID), as stated in FC-SW__2 Section 4.8, incorporated herein by reference in its entirety.

Domain_ID identifies a domain of one or more switches that have the same Domain_ID for all N_Ports and NL_Ports (an N_Port that can perform an Arbitrated Loop function). A domain in the Fibre Channel environment as defined in FC-SW-2, incorporated herein by reference in its entirety, is the highest or most significant hierarchical level in a three-level addressing scheme. If there is more than one switch in a Fabric, then each switch within the Fabric shall be assigned a Domain ID and it is directly connected via an inter-switch link ("ISL") to at least another switch in the Fabric.

Fibre Channel Generic Services (FC-GS-3) specification describes in section 5.0 various Fibre Channel services that are provided by Fibre Channel switches including using a "Name Server" to discover Fibre Channel devices coupled to a Fabric. FIG. 2 shows an example of a Name Server 202A. It is noteworthy that Name Server 202A can be located anywhere in the network.

A Name Server provides a way for N_Ports and NL_Ports to register and discover Fibre Channel attributes. Request for Name server commands are carried over a Common Transport protocol, also defined by FC-GS-3. The Name Server information is distributed among Fabric elements and is made available to N_Ports and NL_Ports after the ports have logged in.

Various commands are used by the Name Server protocol, as defined by FC-GS-3, for registration, de-registration and queries. Fiber Channel Switched Fabric (FC-SW-2) specification describes how a Fabric consisting of multiple switches implements a distributed Name Server.

After an SF_Port logs in, it queries the Name Server to determine the unique World Wide Numbers (WWNs) of the devices that are logged into their Native Fabric. In the FIG. 2 example, HBA 208 and Target 209 are part of Native Fabric Domain 20, while HBA 210 and Target 211 are part of Domain 21 and HBA 212 and Target 213 are part of Domain 22. The query results are then stored in Inter-Fabric Name Server (INS) 202.

INS 202 includes the standard Name Server information, but also includes Proxy Device and Proxy Fabric information, as described below. INS 202 notifies each SF_Port of the devices to which they can have access.

Each SF_Port performs a Virtual N_Port login for devices that are not coupled to a Native Fabric (or for Proxy Devices). For example, as shown in FIG. 2, the following assignments are made: T2 is the proxy target for Target 2 (211) and is made available via SF_Port1. T2 has an identifier of 20.8.1, where 20 is the Domain, 8 is the area value for Fabric Switch 205 and 1 is the virtual N_Port identifier for T2.

H3 is the Proxy Device for HBA 3 (212) and is available via SF_Port1 via FAT1 (204). The proxy identification values for H3 are 20 (Domain), 8 (Area) and 2 (port identifier). Similarly, T3 is the Proxy Device for Target 3 (213) with identifier values of 21 (domain), 9 (area) and 3 (port identifier). H1 is the Proxy Device for HBA 1 (208) with identifier values of 21 (Domain), 9 (Area) and 4 (port address). T1 is the Proxy Device for Target 1 (209) and H2 is the Proxy Device for HBA 2 (210).

Each SF_Port registers each Proxy Device with the Name Server using entries from INS 202. For example, SF_Port 1 registers proxy devices T2 and H3 with the virtual N_Port identification values. FAT 204 entries and steering paths are established upon PLOGI. The WWNs of initiators and targets are verified based on Inter-Fabric Zone set 201 and INS 202 entries. Routing of frames use certain mappings/translations that are described below with respect to the process flow diagram of FIG. 3.

Figure 3:
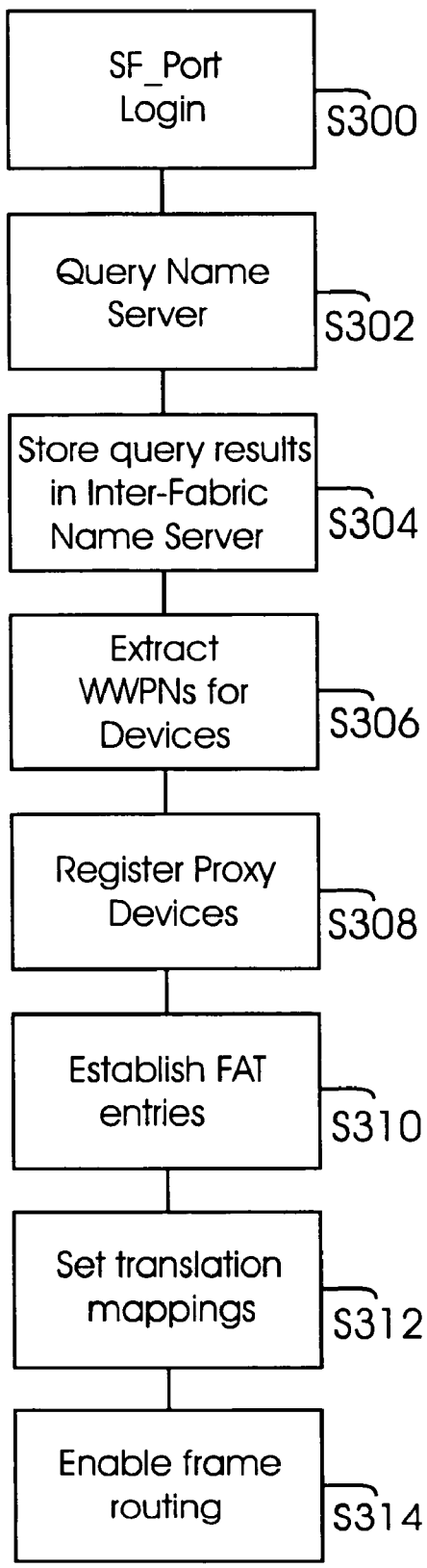
FIG. 3 shows a process flow diagram for Inter-Fabric routing, according to one aspect of the present invention.

FIG. 3 shows a process flow diagram for using Switch 200 in Inter-Fabric routing. Switch 200 allows devices (i.e. hosts and storage systems) to communicate with each other even though they have different Native Fabrics. This is achieved by using Proxy Devices and Virtual N_Port identifiers.

Turning in detail to FIG. 3, in step S300, after Switch 200 is powered up, each SF_Port performs a PLOGI. PLOGI is a standard log in procedure that is performed under the established Fibre Channel standards.

In step S302, each SF_Port queries the Name Server to determine the unique identifiers (for example, WWNS) for each device. In step S304, the query results are stored in INS 202.

In step S306, each SF_Port extracts the unique identifiers of devices/hosts to which it has access. This information is used for address translation. The identifiers in this case include information regarding Native Fabric devices and the Proxy Devices.

In step S308, each SF_Port registers the Proxy devices with the Name Server. For example, SF_Port 1 in FIG. 2 will register the proxy devices T2 and H3, SF_Port 2 registers T3 and H1, while SF_Port 3 registers T1 and H2.

In step S310, Inter-Fabric Address Translator entries are populated. Thereafter, each unique identifier for the initiators/targets is verified as members of Inter-Fabric Zone set 201. The user defines the Inter-Fabric Zone set.

In step S312, translation mapping values for initiator SF_Ports and target Fabric SF_Port are set. Thereafter, in step S314, auto-routing between plural devices is enabled.

An example of auto-routing with respect to FIG. 2 is now provided. The following translations will occur if HBA 1 (208) attached to Fabric Switch 205 wants to communicate with Target 2 (211) attached to Fabric Switch 206. The D_ID for T2 is converted from the Virtual Port ID value to the actual Target 2 value. The S_ID for a frame is converted from the actual S_ID of HBA 1 (208) to the proxy S_ID of H1, where H1 is the Proxy device for SF_Port 2. The inverse translation occurs when Target 2 responds to HBA 1.

Figure 4:
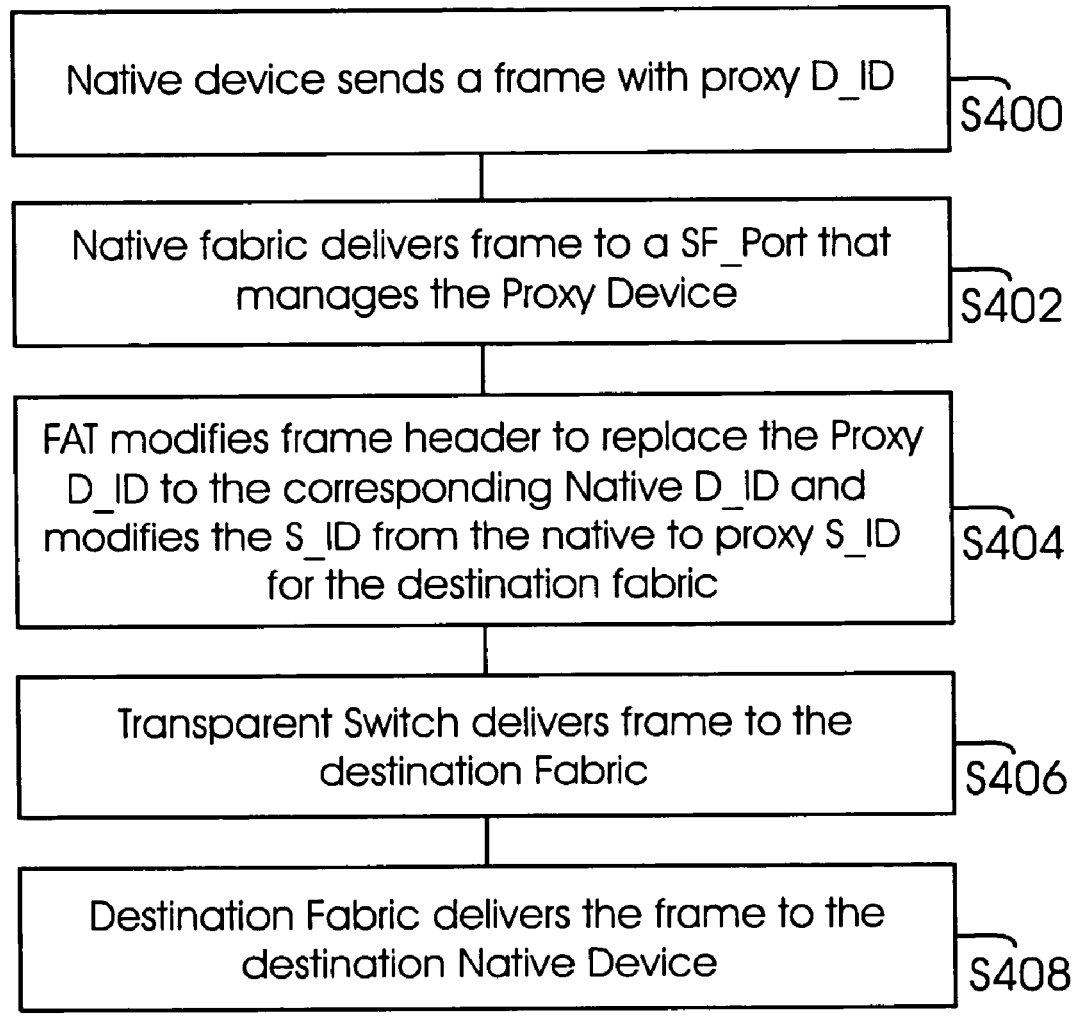
FIG. 4 shows a process flow diagram for routing frames between Fabrics, according to one aspect of the present invention.

FIG. 4 shows a top-level process flow diagram for routing frames between Fabrics using the switch configuration described above with respect to FIG. 3. The process begins in step S400, when a Native Device sends a frame with a proxy D_ID. For example, Native Device, HBA 208 sends the proxy D_ID for Proxy Device T2.

In step S402, the Native Fabric switch delivers the frame to the SF_Port that manages the Proxy Device. In the foregoing example, Fabric Switch 205 forwards the frame to SF_Port 1 (shown as 203 in FIG. 2).

In step S404, FAT 204 modifies the frame header. In particular, the actual Native D_ID (for Target 2 (211)) replaces Proxy D_ID for T2. The S_ID is also modified from the Native Fabric to the Proxy S_ID for the destination Fabric. In this example, the S_ID of HBA 1 (208) is changed to the S_ID of Proxy Device H1.

In step S406, the frame is delivered via crossbar 50 to destination Fabric. In this example, the frame is delivered from Fabric 205 to Fabric 206 via SF_Port 1 and SF_Port 2. Thereafter, in step S408, the destination Fabric delivers the frame to the destination. In the foregoing example, Fabric Switch 206 delivers the frame to Target 2.

In one aspect of the present invention, a Fibre Channel switch element can enable Inter-Fabric auto-routing of frames by using SF_Ports. This does not require Inter-Fabric headers and extensions.

Although the present invention has been described with reference to specific embodiments, these embodiments are illustrative only and not limiting. Many other applications and embodiments of the present invention will be apparent in light of this disclosure and the following claims.

What is claimed is:

1. A Fibre Channel Switch element, comprising:
a first switch port identified by a unique identifier coupled to at least a first switch fabric that is coupled to at least a first device;
a second switch port identified by a unique identifier coupled to at least a second switch fabric that is coupled to at least a second device;
wherein the first switch port registers the second device as a Proxy Device using a first virtual identifier and the second switch port registers the first device as a Proxy Device using a second virtual identifier; wherein the first device and the second device are registered with a Name Server based on entries from an Inter-Fabric Name Server; and before the first device can communicate with the second device, the first device identity and the second device identity is verified with an Inter-Fabric Zone set configured by a user;
wherein the first device sends a frame with a virtual destination address information of the second device to the first switch fabric and the first switch fabric sends the frame to the first switch port;

wherein the first switch port uses a translation module to translate the virtual destination address in the frame to an actual destination address of the second device; and also translates an actual source address value of the first device to a virtual source address value recognized by the second switch port; and wherein the first switch port sends the frame to the second switch port that automatically forwards the frame to the second device via the second switch fabric without using a standard Inter-Fabric frame header.

2. The Fibre Channel Switch element of claim 1, wherein the translation module is a Fabric Address Translator module that modifies source identification values and destination identification values for Inter-Fabric frame routing to enable communication between the first device and the second device.

3. The Fibre Channel Switch element of claim 1, wherein virtual N_Port identification values are used to register the first device and the second device as Proxy Devices; and the Proxy Devices interface with the first switch port and the second switch port for routing Inter-Fabric frames.

4. The Fibre Channel Switch element of claim 1, wherein the first switch port and the second switch port after a log in operation, query the Name Server to determine world wide port numbers of all attached devices and store the query results in the Inter-Fabric Name Server.

5. A method for routing Inter-Fabric frames using a Fibre Channel switch element having a first switch port coupled to at least a first switch fabric that is coupled to at least a first device; and a second switch port coupled to at least a second switch fabric that is coupled to at least a second device, comprising:

(a) querying a Name Server to determine world wide port numbers of devices; wherein the first switch port and the second switch port query the Name Server;

(b) storing query results in an Inter-Fabric Name Server module; wherein the first switch port and the second switch port store the query results;

(c) registering the first device as a Proxy Device for the second switch port and the second device as a Proxy device for the first switch port with the Name Server based on entries from the Inter-Fabric Name Server; wherein before the first device and the second device can interface with the switch ports to route Inter-Fabric frames, the first device identity and the second device identity is verified with an Inter-Fabric Zone set configured by a user;

(d) sending a frame with a virtual destination address information of the second device; wherein the first device sends the frame to the first switch fabric and the first switch fabric sends the frame to the first switch port;

(e) translating a virtual destination address of the second device in the frame to an actual destination address of the second device;

(f) translating an actual source address value of the first device to a virtual source address value recognized by the second switch port; and (g) forwarding the frame to the second device; wherein the first switch port sends the frame to the second switch port that automatically forwards the frame to the second device via the second switch fabric without using a standard Inter-Fabric frame header.

6. The method of claim 5, wherein the Inter-Fabric Name Server for storing the query results is a database.

7. The method of claim 5, wherein the translation in steps (e) and (f) is performed by a Fabric Address Translator.

8. The method of claim 7, wherein the Fabric Address Translator performs address translation to route Inter-Fabric frames without using a standard Inter-Fabric frame header.

9. A Fibre Channel network comprising:

a Fibre Channel switch element operationally coupled to a first switch fabric and a second switch fabric; wherein the first switch fabric is coupled to at least a first device and the second switch fabric is coupled to at least a second device; and wherein the Fibre Channel switch element includes:

a first switch port identified by a unique identifier coupled to at least the first switch fabric;

a second switch port identified by a unique identifier coupled to at least the second switch fabric;

wherein the first switch port registers the second device as a Proxy Device using a first virtual identifier and the second switch port registers the first device as a Proxy Device using a second virtual identifier;

wherein the first device and the second device are registered with a Name Server based on entries from an Inter-Fabric Name Server and before the first device can communicate with the second device, the first device identity and the second device identity is verified with an Inter-Fabric Zone set configured by a user;

wherein the first device sends a frame with a virtual destination address information of the second device to the first switch fabric and the first switch fabric sends the frame to the first switch port;

wherein the first switch port uses a translation module to translate the virtual destination address in the frame to an actual destination address of the second device; and translates an actual source address value of the first device to a virtual source address value recognized by the second switch port; and wherein the first switch port sends the frame to the second switch port that automatically forwards the frame to the second device via the second switch fabric without using a standard Inter-Fabric frame header.

10. The network of claim 9, wherein the translation module is a Fabric Address Translator module that modifies source identification values and destination identification values for Inter-Fabric frame routing to enable communication between the first device and the second device.

11. The network of claim 9, wherein virtual N_Port identification values are used to register the first device and the second device as Proxy Devices; and Proxy Devices interface with the first switch port and the second switch port for routing Inter-Fabric frames.

12. The network of claim 9, wherein the first switch port and the second switch port after a log in operation, query the Name Server to determine world wide port numbers of all attached devices and store the query results in the Inter-Fabric Name Server.

13. A method for routing Inter-Fabric frames using a Fibre Channel switch element having a first switch port coupled to at least a first switch fabric that is coupled to at least a first device; and a second switch port coupled to at least a second switch fabric that is coupled to at least a second device, comprising:

(a) sending a frame with a virtual destination address information of the second device; wherein the first device is registered as a Proxy Device for the second switch port and the second device is registered as a Proxy device for the first switch port with a Name Server based on entries from an Inter-Fabric Name Server; and before the first device can communicate with the second device, the first device identity and the second device identity is verified with an Inter-Fabric Zone set configured by a user; and wherein the first device sends the frame to the first switch fabric and the first switch fabric sends the frame to the first switch port;

(b) translating a virtual destination address of the second device in the frame to an actual destination address of the second device;

(c) translating an actual source address value of the first device to a virtual source address value recognized by the second switch port; and (d) forwarding the frame to the second device; wherein the first switch port sends the frame to the second switch port that automatically forwards the frame to the second device via the second switch fabric without using a standard Inter-Fabric frame header.

14. The method of claim 13, wherein a Fabric Address Translator replaces the virtual destination address of the second device in the frame to an actual destination address of the second device in step (b).

15. The method of claim 14, wherein the Fabric Address Translator replaces the actual source address value of the first device to a virtual source address value recognized by the second switch port.

16. The method of claim 13, wherein virtual N_Port identification values are used to register the first device and the second device as Proxy Devices; and the Proxy Devices interface with the first switch port and the second switch port for routing Inter-Fabric frames.

17. The method of claim 13, wherein the first switch port and the second switch port after a log in operation, query the Name Server to determine world wide port numbers of all attached devices and store the query results in the Inter-Fabric Name Server.

* * * * *

UNITED STATES PATENT AND TRADEMARK OFFICE
CERTIFICATE OF CORRECTION

PATENT NO. : 7,660,302 B2
APPLICATION NO. : 11/453500
DATED : February 9, 2010
INVENTOR(S) : Edward C McGlaughlin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this

Thirtieth Day of November, 2010

David J. Kappos
*Director of the United States Patent and Trademark Office*